United States Patent Office
3,464,780
Patented Sept. 2, 1969

3,464,780
VAT DYEING WITH SULFONATED BENZOYLIMI-
NO-DIANTHRAQUINONE VAT DYES OR VAT
DYES WITH FIVE-FUSED RINGS
Kurt Weber, Max Staeuble, and Paul Ulrich, Basel, and
Walter Kern, Sissach, Switzerland, assignors to Ciba
Limited, Basel, Switzerland, a Swiss company
No Drawing. Continuation-in-part of application Ser. No.
155,479, Nov. 28, 1961. This application Apr. 30, 1965,
Ser. No. 452,356
Claims priority, application Switzerland, Nov. 29, 1960,
13,357/60, 13,358/60
Int. Cl. D06p 1/24; C09b 9/02
U.S. Cl. 8—34  8 Claims

ABSTRACT OF THE DISCLOSURE

Vat dyeing polyhydroxylated textile materials such as cellulosic or polyvinyl alcohol fibrous materials with vat dyes having two anthraquinone groups or 5 fused rings, each of said dyes having a sulfonated benzoylamino group thereon. In an example, the vat dye is

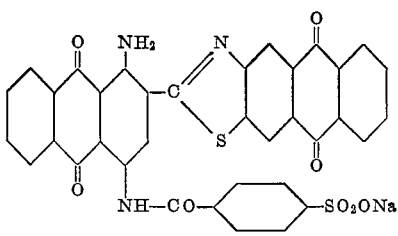

---

This is a continuation in part of our application Ser. No. 155,479 filed Nov. 28, 1961, now abandoned.

It is known that vattable polycyclic quinones containing at least one hydrophilic group and at least one group that is capable of being fixed by chemical means, yield valuable and fast dyings on polyhydroxylated materials such as textiles of polyvinyl alcohol or especially of cellulose, when at least one stage of the process is carried out in the presence of a reducing agent.

The present invention is based on the surprising observation that equally fast dyings can be obtained in accordance with the above procedure by using a vattable, polycyclic quinone despite the fact that it contains no group that can combine chemically with the polyhydroxylated material. The present invention thus concerns a process for coloring polyhydroxylated fibrous materials with vattable, polycyclic quinones, wherein in at least one stage of the process a polycyclic quinone is reduced to its leuco form in the presence of an alkaline reducing agent and wherein the polycyclic, vattable quinone which is subsequently reoxidized on the fibers is free from reactive group and from azo linkage but contains at least one acylamino group bound by its —CO—NH-group and at least one sulfonic acid group bond to the chromophore through its sulfur atom and is selected from those having at least 5 condensed rings and those having at least 2 anthraquinone residues.

Polycyclic quinones of the above-mentioned type are those which on reduction yield the so-called leucoform or vat, which latter form has a higher degree of affinity for natural or regenerated cellulose fibers than has the unreduced form, and which can be reoxidized to the original chromophore system. Especially suitable quinones are those of the anthraquinone series, for example, those containing a 9:10-dioxoanthracene ring condensed on to at least two carbocyclic or heterocyclic rings, or that comprise two to three anthroquinone residues, for example, two such residues bound together directly, that is to say by a direct bond, or by a double bond or through an organic bivalent bridge. Such bivalent bridges are, for example, the —NH— and —CH=N—N=CH- groups, the alkylene-arylene-diamine- and di- or polycarboxylic acid radicals, heterocyclic rings such as one or more imidazole-, triazole-, triazine-, cyameluric acid-, pyridine-, quinazoline-, oxazole-, or thiazole rings. Two anthraquinone residues which may be similar to or differ from one another, may be bound together across such a bridge system. The vattable polycyclic quinones used in the process of the invention are thus vat dyestuff-sulfonic acids whose sulfonic acid group is not hydrolysed in the vat. After the reoxidation, the vat dyestuff-sulfonic acid is regenerated on the dyed fiber. The above polycyclic quinones therefore clearly distinguished from the dyestuffs described in U.S. Patent No. 2,778,839 to Peter which are no vat dyestuffs and from the dyestuff of U.S. Patent No. 3,110,541 to Weber whose sulfonic acid groups are eliminated in the vat together with the acyl residues to which they are bound. They are also distinct from the wool dyes of U.S. Patent No. 2,093,355, which are no vat dyestuffs, as well as from the reactive dyes such as those of U.S. Patents No. 3,031,252 and No. 2,895,785.

The vattable polycyclic quinone to be used in the process of the invention are preferably free from azo linkages and belong to the vat dyestuff class of the anthraquinone series. They may contain one of the following polycyclic quinone residues: Thiophanthraquinone, anthrapyrimidine, anthrapyridone, isothiazoleanthrone, quinazolineanthraquinone, oxazoleanthraquinone, thiazoleanthraquinone, anthraquinonyltriazole, acylaminoanthraquinone, pyrazoleanthraquinone, dipyrazoleathronyl, pyrazinoanthraquinone, anthraquinone-hydrazone, azomethine-anthraquinone, azaanthraquinone, azabenzanthrone, anthraquinoneacridone, indanthrone, thioxanthoneanthraquinone, anthrimide, di-, tri- or tetraanthrimide-carbazole, dihydroacridine, anthanthrone, pyranthrone, dibenzyrenquinone, dibenzanthrone, isodibenzanthrone, flavanthrone, acedianthrone and phthaloyl compounds of bi- or poly-nuclear hydrocarbons. One or two acylamino, preferably aroyl amino groups must be bound to the quinone by their —CO—NH-groupings and there must be present one to three stable sulfonic acid groups i.e. groups bound by their sulfur atom to the chromophore, so that they are not eliminated in the vat. The sodium salts of the vat dyestuff-sulfonic acids used in the process of the invention have a water solubility of at least 5 grams per liter, preferably 10 to 100 grams per liter, at 95° C.

The polycyclic quinones used in the process are obtained by sulfonating, or using chlorosulfonic acid to chlorosulfonate, the above-mentioned polycyclic quinones which contain at least 5 condensed rings or at least 2 anthraquinone residues, or by treating the corresponding quinones which contain at least one acylatable $NH_2$— group, with an acylating agent, especially with an aromatic carboxylic acid-halide, which contains at least one —$SO_3H$ or one halogen —$SO_2$ group.

The dyestuffs obtained in the above manner may be used for padding, dyeing in a dye bath of printing cellulose-containing materials including those of artificial fibers, for example, regenerated cellulose or viscose materials, or natural products such as linen or above all cotton. For these processes, the particular dyestuff may suitably be used as an aqueous solution or suspension thereof or as an ingredient in a printing paste. Cotton may be dyed with the dyestuff by the known Padroll Process, wherein the padded material is wound on a spool which is slowly rotated while dyeing at the desired temperature.

The dyeing is usually advantageously carried out at a temperature below that which is normally used in the cotton dyeing industry, for example, at a temperature below 90° C., for example, at about 50° C. In order to facilitate the exhaustion of the dye bath, it is advisable to add a more or less neutral and above all an inorganic salt such as an alkali-metal chloride or alkali-metal sulfate, if desired portionwise, to the dye bath, either together with the dyestuff or during the course of the dyeing process. Advantageously, the dye bath is adjusted to a distinctly alkaline pH-value, either during or at the start of the process, by adding an alkali, for example, sodium carbonate or potassium carbonate, or above all by adding a solution of an alkali-metal hydroxide.

The reducing agent used may be a strong reducing agent such as sodium hydrosulfite, thiourea dioxide, or, if desired, it may be a weak reducing agent such as sodium sulfide, sodium hydrosulfide or glucose. The amount of reducing agent used may vary within wide limits. In many cases, a substantially smaller amount of reducing agent need be used than is usually required when vat or sulfur dyestuffs are used.

The reducing agent may be introduced at the beginning, during the course or towards the end of the dyeing process.

Instead of preparing a dye bath (by adding the vattable compound, the reducing agent and, if desired, the more or less neutral inorganic salt, together or consecutively to water), the dyestuff and the salts may, alternatively, be made up into a stiff paste or preferably into a dry preparation.

By the present process, polyhydroxylated materials, especially cellulose textiles are provided with dyeings or prints that have excellent wet fastness properties and very good fastness to light.

In contradistinction to known vat dyeing processes, the process of the present invention is much simpler owing to the fact that the preliminary vatting procedure in the stock vat can either be omitted entirely or at any rate can be substantially accelerated and simplified. Furthermore, the process is not so dependent upon the temperature used. The present invention provides dyeings which have a high degree of uniformity and penetration. Full and very even dyeings are obtained, especially on regenerated cellulose, and the tints provided by corresponding dyeings are often the same on regenerated cellulose as on cotton.

The following examples illustrate the invention. Unless otherwise indicated the parts and percentages are parts and percentages by weight, and the relationship between parts by weight and parts by volume is the same as that between the kilogram and the liter:

EXAMPLE 1

0.15 part of the dyestuff of the formula

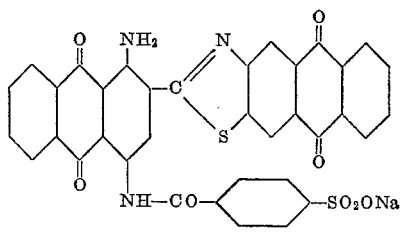

which is obtained by condensing the corresponding amine with benzoyl chloride-4-sulfochloride in nitrobenzene and transforming the resulting sulfochloride, by vatting and reoxidization, into the corresponding sodium salt which has a water solubility of 30 grams per liter at 95° C., is dissolved in 50 parts of water. The solution obtained is added to a solution at 50° C. comprising 2 parts by volume of a sodium hydroxide solution of 30% strength and 1.2 parts of sodium hydrosulfite in 350 parts of water. 10 parts of cotton are dyed in this dye bath at 40–50° C., for 1 hour, while adding 8 parts of sodium chloride. The cotton is then squeezed out, oxidized in the air, rinsed, acidified, rinsed again and finally soaped at the boil. The greenish blue dyeing so obtained has very good properties of fastness to light and wetness.

EXAMPLE 2

In the manner described in Example 1, there is used 0.15 part of the dyestuff of the formula

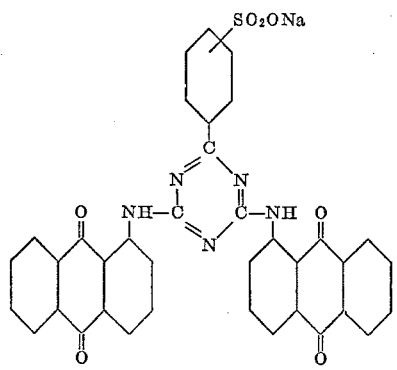

which has a solubility in water of 15 grams per liter at 95° C. and which is obtained by condensing the sulfochloride of 2 - phenyl - 4:6 - dichloro - triazine-(1:3:5) with 2 molecular proportions of 1-amino-anthraquinone in nitrobenzene, at 140° C., and hydrolysing the SO₂Cl by vatting and reoxidizing. A yellow dyeing of excellent fastness is obtained.

EXAMPLE 3

In the manner described in Example 1 there is used 0.15 part of the dyestuff of the formula

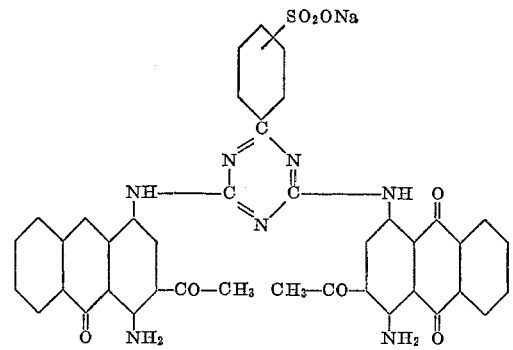

which has a water solubility of 20 grams per liter at 95° C. and which is obtained by condensing the sulfochloride of 2-phenyl-4:6-dichloro-1:3:5-triazine with 2 molecular proportions of 1:4-diamino-2-acetyl-anthraquinone in nitrobenzene at 120° C., vatting the sulfochloride and reoxidizing the dyestuff. A blue dyeing of excellent fastness is obtained.

EXAMPLE 4

0.2 part of the dyestuff of the formula

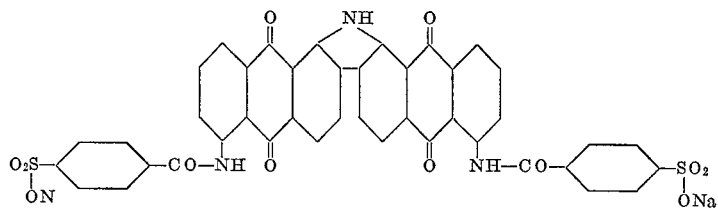

which has a solubility in water of 12 grams per liter at 95° C. is used in the manner described in Example 1. A golden orange dyeing of excellent fastness is obtained. The above dyestuff is obtained in the following manner:

24.2 parts of benzoic acid-para-sulfochloride in 250 parts of nitrobenzene are heated, at 100–110° C. for 1 hour and with stirring, with 20 parts of thionyl chloride and 0.5 part of dimethyl formamide. A clear solution is obtained from which the excess thionyl chloride is removed by distillation under reduced pressure. 22.9 parts of 5:5'-diamino-1:1'-dianthrimidecarbazole are then added and the mixture is kept at 120–125° C. for 21 hours. After cooling, the crystallized dyestuff is filtered, washed with benzene, vatted reoxidized, filtered and dried.

By using the same amount of benzoic acid-metasulfochloride instead of the benzoic acid-para-sulfochloride, or an equivalent amount of para-benzoic acid-sulfofluoride, similar dyestuffs with similarly excellent properties of fastness are obtained.

EXAMPLE 5

0.15 part of the dyestuff of the formula

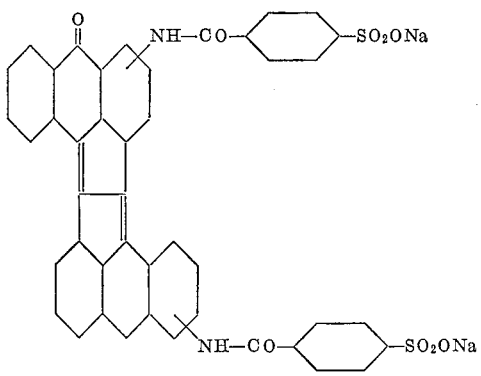

is used in the manner described in Example 1. A full brown dyeing of good properties of fastness is obtained. The deystuff may be obtained in the following manner:

24.2 parts of benzoic acid-par-sulfochloride in 250 parts of nitrobenzene are heated at 100–110° C. for 1 hour, with 20 parts of thionyl chloride and 0.5 part of dimethyl formamide. The excess thionyl chloride is then distilled off under reduced pressure. 21.8 parts of diaminoacedianthrone are then added at 100° C. and the mixture is heated at 120–125° C., with stirring, for 8 hours. After cooling, the crystallized dyestuff is filtered, washed with nitrobenzene and benzene, vatted in order to hydrolize the —$SO_2Cl$ group, reoxidized and then dried.

By using the same amount of benzoic acid-metasulfochloride instead of the benzoic acid-para-sulfochloride a very similar dyestuff with similarly excellent properties of fastness is obtained.

EXAMPLE 6

Pad-jig process

Cotton fabric is padded with a solution of 10 parts of the dyestuff used in Example 1 in 1000 parts of water until a moisture uptake of 70% has been reached. The fabric is then developed or vatted for 30 minutes in a bath, at 50° C., containing per 1000 parts of water, 20 parts by volume of a sodium hydroxide solution of 30% strength and 18 parts of sodium hydrosulfite. After this dyeing process the dyed material is oxidized, rinsed, acidified, rinsed again and then soaped at the boil. A greenish blue dyeing of excellent fastness is obtained.

By using 9 parts of thiourea dioxide instead of the 18 parts of sodium hydrosulfite, similarly good results are obtained.

The above-mentioned dyestuff solution may be prepared in the following manner:

14 parts of the dyestuff used in Example 1 are finely milled with 14 parts of sodium dinaphthyl-methane-disulfonate and 112 parts of water in a ball mill. 100 parts of the 10% dyestuff paste so obtained are then diluted with 900 parts of water.

EXAMPLE 7

Pad-jig process 14 parts of the dyestuff used in Example 4 are finely milled with 14 parts of sodium dinaphthyl-methane-disulfonate and 112 parts of water in a ball mill. 100 parts of the 10% dyestuff paste so obtained are diluted with 900 parts of water. The resulting solution is used for dyeing in the same manner as that described in Example 6. A golden orange dyeing of outstanding properties of fastness to light and washing is obtained.

By using this dyestuff to dye regenerated cellulose in the manner described in Example 6, a dyeing with similarly outstanding properties of fastness is obtained.

EXAMPLE 8

Pad-steam process 100 parts of the 10% dyestuff paste described in Example 6 are diluted with 900 parts of water. The resulting solution is used to impregnate cotton fabric until a moisture uptake of 70% has been reached.

The fabric, which may or may not first be dried, is then re-impregnated with a solution containing per 1000 parts of water, 25 parts of a sodium hydroxide solution of 30% strength and 20 parts of sodium hydrosulfite. The squeezing-effect amounts to 80–120%. It is then steamed for 30–60 seconds and finally after-treated in the manner described in Example 1. A blue dyeing of excellent fastness to light and washing is obtained.

EXAMPLE 9

By using the 10% dyestuff paste used in Example 7, in the process described in Example 8, similarly good results are obtained.

EXAMPLE 10

Wet-padding steam process 100 parts of the 10% dyestuff paste used in Example 6 are diluted with 700 parts of warm water. After cooling to 30° C., 30 parts by volume of a sodium hydroxide solution of 30% strength and 20 parts of sodium hydrosulfite are added to the solution obtained, which is then diluted with water to a total of 1000 parts.

Cotton fabric is padded with the above solution and then immediately steamed in a steam vessel for 30–60 seconds. The fabric is then rinsed, oxidized and soaped at the boil in the manner described in Example 6. A blue dyeing of outstanding fastness to light and washing is obtained.

Similarly good results are obtained by using a mixture of 40 parts of sodium sulfide and 10 parts of sodium hydrosulfite instead of the 20 parts of sodium hydrosulfite.

EXAMPLE 11

The 10% dyestuff paste used in Example 7 may be used instead of the dyestuff in the process described in Example 10 to yield a yellow dyeing which is similarly fast to washing at the boil.

EXAMPLE 12

Single-bath steam process

Cotton fabric is padded at 30° C. with a solution containing per 1000 parts of water, 100 parts of the 10% dyestuff paste described in Example 6, 50 parts of urea, 50 parts of potasium hydroxide and 70 parts of sodium formaldesulfoxylate. It is then dried at 60–80° C., steamed for 5 minutes and the dyeing is then after-treated by oxidizing, soaping etc., in the manner described in Example 6. A greenish blue dyeing of outstanding general properties of fastness is obtained.

EXAMPLE 13

By using the 10% dyestuff paste of Example 7 in the manner described in Example 12, a yellow dyeing that is fast to washing at the boil and to light is obtained.

By applying the above-mentioned dyestuff to linen fabric, similarly good dyeings are obtained.

EXAMPLE 14

Molten-metal process 100 parts of the 10% dyestuff paste used in Example 6 are diluted with 900 parts of water. The solution obtained is used to impregnate cotton fabric until a bath uptake of 70% has been achieved.

The so-padded fabric, with or without an intermediary drying, is passed through a solution containing per 1000 parts of water, 22 parts by volume of a sodium hydroxide solution of 30% strength and 18 parts of sodium hydrosulfite.

The fabric is then processed by passing it through a bath containing an alloy of low melting point immediately after leaving the chemical bath. The fabric is retained in the metal bath, at 90° C., for 5–15 seconds.

After leaving the metal bath, the fabric is rinsed, oxidized, rinsed again and finally soaped at the boil. A greenish blue dyeing of outstanding fastness to light and washing is obtained.

EXAMPLE 15

By using 100 parts of the 10% dyestuff paste used in Example 7 instead of the dyestuff in Example 14, similarly good results are obtained.

EXAMPLE 16

Pigment process using a circulation-dyeing apparatus 10 parts of the dyestuff used in Example 1 are stirred into 957 parts of water at 30° C. 1 part of an alkylnaphthalene sulfonate or other suitable assistant is then added.

100 parts of cotton yarn are passed through the above mixture at 30° C. and the direction of circulation is alternated in the usual manner. After 10 minutes 30 parts of sodium chloride and 2 parts by volume of acetic acid of 40% strength are added portionwise. The yarn is pigmented for 45 minutes while slowly raising the temperature to 50° C. The pigment liquor is then completed exhausted. 10 parts by volume of sodium hydroxide solution of 30% strength and 3 parts of sodium hydrosulphite are then added and the pigmented yarn is vatted in the same bath for 30 minutes at 50° C.

The yarn is then rinsed, oxidised and finally soaped at the boil. A greenish blue dyeing of good general fastness is obtained.

EXAMPLE 17

Pad-roll process

Cotton fabric is impregnated with a padding solution at 30° C. containing per 1000 parts of water, 100 parts of the 10% dyestuff paste used in Example 6, 50 parts of thiociethylene glycol, 50 parts of sodium hydroxide solution of 30% strength and 40 parts of sodium formaldehyde sulphoxylate.

The fabric is then passed through an infrared zone or steam channel so that its temperature is raised to about 60° C. and then put into a heated, preferably air-free, cabinet in which the rolled-up fabric is heated for 2–3 hours at 60° C. It is then oxidised and soaped in the manner described in Example 1. A greenish blue dyeing of good general fastness is obtained.

EXAMPLE 18

A printing paste is prepared with the following ingredients:

100 parts of the 10% dyestuff paste used in Example 6, 150 parts of water, 50 parts of Rongalit and 700 parts of potassium carbonate thickener (total=1000 parts).

The potassium carbonate thickener is prepared from 90 parts of wheat starch, 90 parts of water, 100 parts of glycerine, 140 parts of British gum powder, 170 parts of tragacanth mucilage 60/1000. 170 parts of potassium carbonate and 240 parts of water (total=1000 parts).

The paste is used to printing cotton fabric by means of a rouleaux printing machine. The fabric is then dried and steamed for 5–8 minutes in a Mather-Platt at 103° C. It is then after-treated in the usual manner. A blue print of excellent fastness is obtained.

Similarly good results are obtained by using the above to print fabrics of viscose rayon and viscose staple rayon.

EXAMPLE 19

Two-phase printing process

A printing dye is prepared from 100 parts of the 10% dyestuff paste of Example 6, 400 parts of water and 500 parts of Alkaprint/monagum thickener (total=1000 parts).

Cotton fabric is printed with the above dye and then dried. The dry fabric is then padded with a solution containing per 1000 parts of water, 120 parts of sodium hydroxide solution of 30% strength, 70 parts of sodium hydrosulphite and 15 parts of borax.

The fabric is then immediately steamed or vatted at 120° C. without first being dried. It is then oxidised and soaped in the manner described in Example 1. A greenish blue print of very good fastness to light and washing is obtained.

When viscose staple rayon is printed in the above manner, similarly good results are obtained.

EXAMPLE 20

By using a dyestuff given in column II in the manner described in the example indicated in column III of the following table, dyeings are obtained that have the tints shown in column IV.

| I | II | III | IV |
|---|---|---|---|
| 1 | 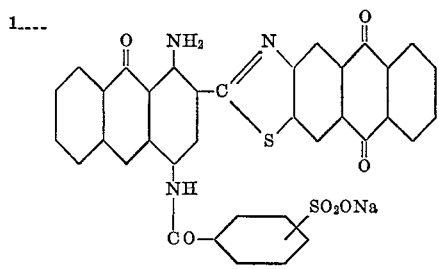 | 6 | Blue. |
| 2 | 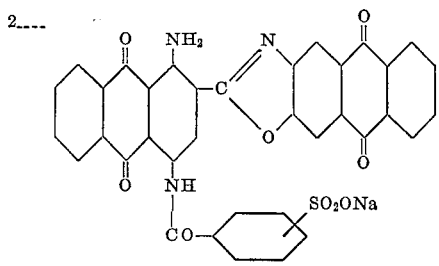 | 1 | Do. |
| 3 | 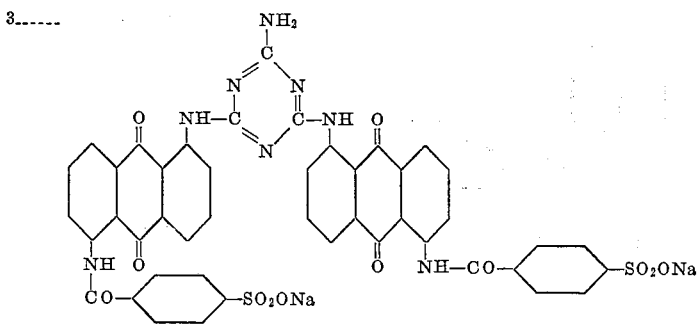 | 1 | Golden-orange. |
| 4 | 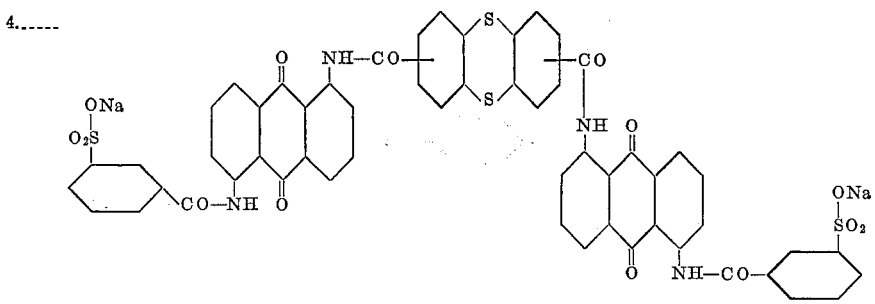 | 1 | Yellow. |
| 5 | 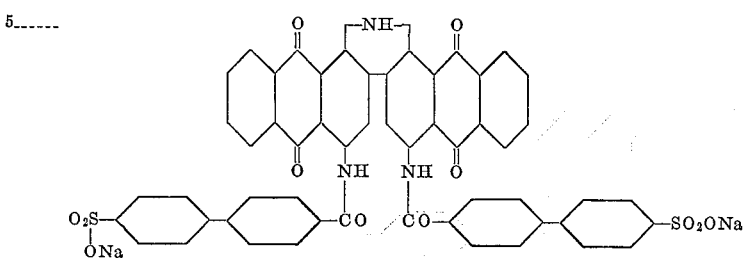 | 1 | Olive-grey. |
| 6 | 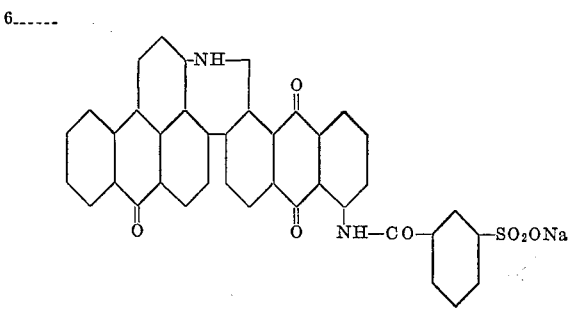 | 1 | Green-olive. |

| I | II | III | IV |
|---|---|---|---|
| 7 | (structure) | 1 | Blue. |
| 9 | (structure) | 1 | Yellow. |
| 10 | (structure) | 1 | Yellow. |
| 11 | (structure) | 1 | Orange. |
| 12 | (structure) | 1 | Orange. |
| 13 | (structure) | 1 | Yellow. |

| I | II | | III | IV |
|---|---|---|---|---|
| 14 | 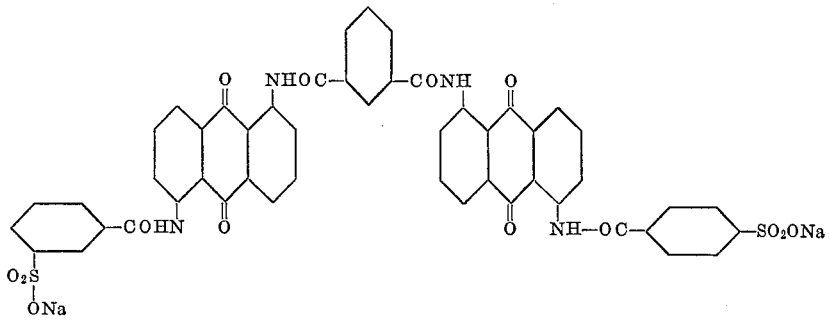 | | | 1 Yellow. |

The dyestuffs shown in the above table which has a solubility in water of 15–80 grams per liter at 95° C., may be obtained, for example, by acylating the corresponding dyestuff intermediate that contains an acylatable amino group with a corresponding carboxylic acid-sulfonic acid-dichloride with warming in nitrobenzene, vatting the resulting dyestuff sulfochloride and reoxidizing the dyestuff.

EXAMPLE 21

0.15 part of the dyestuff of the formula

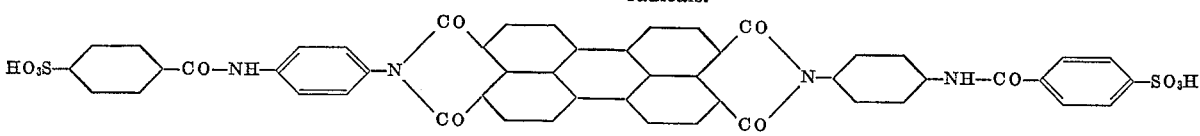

which is obtained by acylating the corresponding diamine with benzoic acid-para-sulfochloride in pyridine at 110° C. is used in the manner described in Example 1. A red dyeing is obtained.

A dyestuff having similar color properties is obtained by acylating with diphenyl-carboxylic acid-dichloride and sulfonating with dilute oleum.

EXAMPLE 22

The water-soluble dyestuff obtained by sulfonating 4:4′-dibenzoyl-diamino-1:1′-dianthrimide-carbazole with oleum containing 10% of free $SO_3$ at 50–60° C. which has a solubility in water of about 50 grams per liter at 90° C. is used in the following manner:

0.2 part of the dyestuff is dissolved in 50 parts of hot water. This solution is then poured into a solution at 50° C. comprising 2 parts by volume of a sodium hydroxide solution of 30% strength and 1.2 part of sodium hydrosulfite in 350 parts of water. 10 parts of cotton are added immediately and dyeing is carried out for 45 minutes at 50° C. with the addition of 12 parts of sodium chloride. It is then oxidized, rinsed, acidified, thoroughly rinsed and finally hydrolyzed by boiling. An olive-green dyeing of good fastness is obtained.

Similar dyeings may be obtained by using the dyestuff obtained by acylating 4:4′-diamino-1:1′-dianthrimide-carbazole with benzoic acid-meta- or-para-sulfochloride in pyridine at 110° C., by sulfonating 4:4′-di-(paraphenyl-benzoylamino)-1:1′-dianthrimide-carbazole with oleum containing 5% of free $SO_3$ at room temperature, or by sulfonating 4:4′-dibenzoylamino-1:1′-dianthrimide with about 32% oleum at a raised temperature.

Another olive dyeing is obtained by using a dyestuff prepared by stirring 4:4′-diamino-1:1′-dianthrimide and benzoyl chloride with sulfuric acid of 100% strength and oleum of 63% strength at a raised temperature. The mixture is then cooled, a small amount of water is added dropwise and then stirred for some time at 20–30° C. with copper powder. The product may also be used in the present process.

What is claimed is:

1. A process for coloring polyhydroxylated fibrous materials with vattable, polycyclic quinones, wherein in at least one stage of the process a polycyclic quinone is reduced to its leuco form in the presence of an alkaline reducing agent and wherein the polycyclic, vattable quinone which is subsequently reoxidized on the fibers is free from reactive group and from azo linkage but contains at least one sulfonic acids substituted benzolylamino group bound by its —CO—NH— group and at least one sulfonic acid group bound to the chromophore through its sulfur atom and is selected from those having at least 5 condensed rings and those having at least 2 anthraquinone radicals.

2. A process as claimed in claim 1, wherein an anthraquinone vat dyestuff is used, which contains a sulfoaroylimino group bound through its —CO—NH— group in α-position of an anthraquinone nucleus.

3. A process as claimed in claim 2, wherein the quinone used contains a heterocyclic bridge between two anthraquinone radicals.

4. A process as claimed in claim 1, wherein a polycyclic quinone sulfonic acid is used whose sodium salt is water soluble.

5. A process as claimed in claim 1, wherein the polycyclic quinone used contains an α-benzoyl-imino anthraquinone bound through an aromatic dicarboxylic acid bridge to a second anthraquinone radical.

6. A process as claimed in claim 3, wherein a triazine-containing polycyclic quinone is used.

7. A process as claimed in claim 1, wherein the reducing agent used is selected from the group consisting of an alkali-metal hydrosulfite, alkali-metal sulfide, alkali-metal hydrosulfide, thiourea dioxide and hydroxy alkane-sulfonic acid.

8. A process for dyeing cotton according to claim 1.

References Cited

UNITED STATES PATENTS

| 3,031,252 | 4/1962 | Stauble et al. | 8—34 |
| 3,110,541 | 11/1963 | Weber et al. | 8—34 |
| 3,339,999 | 9/1967 | Wick | 8—34 |

OTHER REFERENCES

Zollinger: Amer. Dyestuff Reporter, pages 29–36, Mar. 7, 1960.

GEORGE F. LESMES, Primary Examiner

D. LEVY, Assistant Examiner

U.S. Cl. X.R.

260—377